United States Patent [19]

Suzuki et al.

[11] Patent Number: 4,931,825
[45] Date of Patent: Jun. 5, 1990

[54] IMAGE RECORDING APPARATUS PROVIDED WITH EXPOSURE UNIT USING CATHODE RAY TUBE

[75] Inventors: Makoto Suzuki; Shigeru Mizuno; Kazuo Sangyoji; Osamu Takagi, all of Nagoya, Japan

[73] Assignee: Brother Kogyo Kabushiki Kaisha, Aichi, Japan

[21] Appl. No.: 203,103

[22] Filed: Jun. 7, 1988

[30] Foreign Application Priority Data

Jun. 9, 1987 [JP] Japan ................... 62-143475
Jun. 9, 1987 [JP] Japan ................... 62-143476
Jun. 26, 1987 [JP] Japan ................... 62-160789

[51] Int. Cl.⁵ .................... G03G 21/00; G03G 15/01
[52] U.S. Cl. .................... 355/20; 355/326; 355/327; 355/202
[58] Field of Search ................ 355/20, 229, 234, 233, 355/235, 248, 230, 256, 327, 326, 202; 358/244.2

[56] References Cited

U.S. PATENT DOCUMENTS

| | | |
|---|---|---|
| 3,681,777 | 9/1972 | Smura . |
| 3,705,767 | 12/1972 | Tamai et al. ............ 355/326 |
| 3,976,372 | 8/1976 | Miyata et al. ............ 355/327 |
| 3,980,405 | 9/1976 | Tatsuno et al. ............ 355/20 |
| 3,982,831 | 9/1976 | Kingsley ............ 355/202 |
| 4,740,820 | 4/1988 | Endo . |
| 4,746,934 | 5/1988 | Schoening . |
| 4,803,514 | 2/1989 | Hiratsuka et al. ............ 355/327 |

FOREIGN PATENT DOCUMENTS

| | | |
|---|---|---|
| 999043 | 7/1965 | United Kingdom . |
| 1114081 | 5/1968 | United Kingdom . |
| 1401903 | 8/1975 | United Kingdom . |
| 1594866 | 8/1981 | United Kingdom . |
| 2132780 | 7/1984 | United Kingdom . |

Primary Examiner—A. T. Grimley
Assistant Examiner—Nestor R. Ramirez
Attorney, Agent, or Firm—Oliff & Berridge

[57] ABSTRACT

An electrophotographic printer having a movable image developing device for forming a visible image on a photosensitive sheet. The printer contains a sheet handling unit having a light receiving portion for feeding the photosensitive sheet to the light receiving portion and for discharging the same therefrom; an exposure unit containing a cathode ray tube which projects its displaying image onto the photosensitive sheet when the sheet is at the light receiving portion so as to produce an electrostatic latent image on the sheet; and, the image developing device selectively movable between first and second positions, the developing device containing a developer for developing the electrostatic latent image into the visible image with the developer. A copying apparatus is also disclosed whose CRT in an exposure unit has a scrolling function. The copying apparatus also provides a control for controlling scrolling speed in synchronization with the feeding speed of the sheet. The CRT used in the above described device has a screen whose edge portion provides brightness higher than that of the remaining portion.

4 Claims, 3 Drawing Sheets

IMAGE RECORDING APPARATUS PROVIDED WITH EXPOSURE UNIT USING CATHODE RAY TUBE

BACKGROUND OF THE INVENTION

The present invention relates to an image recording apparatus such ms an electrophotographic printer and a copying apparatus, and more particularly, to such apparatus using an image exposure from a cathode ray tube. The invention also relates to an exposure unit using a cathode ray tube in the image recording apparatus.

Some copying apparatus employ a photosensitive sheet as disclosed in Japanese Laid-Open Patent Application Kokai No.61-166573. In such copying apparatus, the photosensitive sheet is exposed with light that has been emitted from a light source and passed through a colored original, to form a latent image on the photosensitive sheet, and the latent image is then developed into a visible image by a wet-type developing device.

The above process however cannot be utilized in an electrophotographic printer employing a photosensitive sheet. Further, it has been difficult to construct a printer which makes use of high resolutional power which is inherent to the photosensitive sheet by relying upon the conventional process.

Further, there is known a copying apparatus for copying an image displayed on a CRT by applying a signal sent to the CRT to another printer. Another method of recording a CRT image has been to photograph the CRT image.

The copying apparatus employing another printer to copy the CRT display image is not of satisfactory quality, and the resultant image is of a fixed image. The photographing process has also been unsatisfactory in that it can only record still images and it is tedious and time consuming to photograph a CRT image. Recent CRT displays have a scrolling capability for continuously moving the displayed image in the screen up or down. There has been a demand for copying such a continuously scrolled CRT image. However, a suitable apparatus has not been available to meet such a demand.

Furthermore, it is known that when the image of an object is focussed on a surface through an optical lens, the brightness of the edge of the formed image is lowered due to the cosine fourth power law. Therefore, when an image displayed on a CRT screen is formed on a photosensitive recording medium through the optical lens, the brightness of the edge of the formed image is reduced. Heretofore, it has not been practiced to compensate for such a reduction in the brightness of the edge of the formed image on the photosensitive recording medium.

SUMMARY OF THE INVENTION

In view of the above-described conventional drawbacks, it is an object of the invention to provide a page printer having a relatively simple structure which can employ a normal photosensitive sheet that is not specially subjected to sensitization to dyes.

Another object of the invention is to provide a copying apparatus for applying light from a CRT screen which displays an image to be copied, to a photosensitive sheet directly or through a lens system, to thus produce a copy of the image with good quality at a desired magnification ratio.

Still another object of the invention is to provide such copying apparatus capable of producing a copy image responsive to a scrolling image on CRT.

Still another object of the invention is to provide an improved exposure unit using CRT and an optional lens while preventing the brightness of the edge portions of an image formed on an photosensitive recording medium from being lowered.

According to the present invention, there is provided an electrophotographic printer for forming a visible image on a photosensitive sheet comprising; a sheet handling unit having a light receiving portion for feeding said photosensitive sheet to the light receiving portion and for discharging the same therefrom; an exposure unit comprising a cathode ray tube which projects its displaying image onto the photosensitive sheet when the sheet is at said light receiving portion so as to produce an electrostatic latent image on the sheet; and, an image developing device selectively movable between first and second positions. The developing device contains a developer for developing the electrostatic latent image into the visible image.

According to the present invention, there is also provided a copying apparatus for forming a visible image on a photosensitive sheet comprising; a sheet handling unit having a light receiving portion for feeding the photosensitive sheet to the light receiving portion and for discharging the sheet therefrom; an exposure unit comprising a cathode ray tube which projects its displaying image onto the photosensitive sheet when the sheet is at the light receiving portion, the cathode ray tube having a display image scrolling function; controlling means connected between the sheet handling unit and the cathode ray tube for controlling a speed of the scrolling in synchronization with a speed of feeding of the photosensitive sheet, so that a continuous latent image is provided on the photosensitive sheet in accordance with scrolling display image from the cathode ray tube: and, an image developing device for developing the latent image into the visible image.

According to the present invention, there is further provided an exposure unit for use in an image recording apparatus which uses a photosensitive sheet on which a latent image is provided upon light exposure, comprising; a cathode ray tube having a display screen from which a display image is projected onto the photosensitive sheet: an optical lens positioned between the cathode ray tube and the photosensitive sheet; and, controlling means connected to the cathode ray tube for controlling brightness at edge portions of the screen higher than that of the remaining portion.

These and other objects will become more apparent from the following description when taken in conjunction with the accompanying drawings in which preferred embodiments of the invention are shown by way of illustrated example.

BRIEF DESCRIPTION OF THE INVENTION

DETAILED DESCRIPTION OF THE PREFERRED EMBODIMENTS

Figure 1:
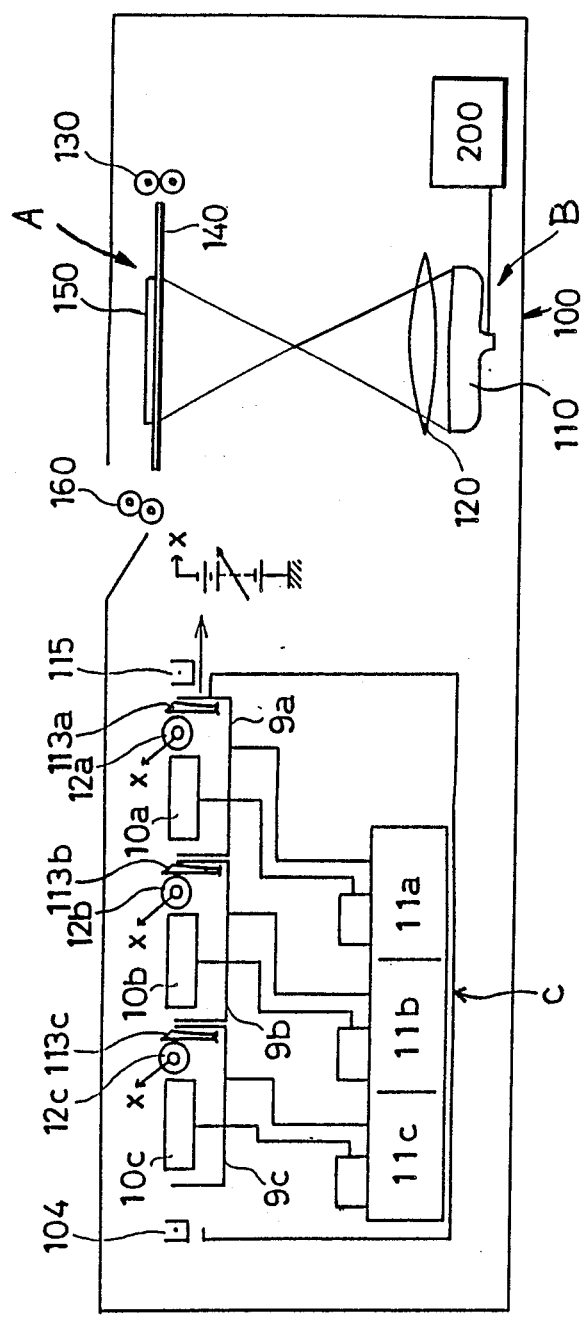
FIG. 1 is a schematic vertical cross-sectional view showing an electrophotographic printer according to an embodiment of the invention.

FIG. 1 shows an electrophotographic printer 100 according to a first embodiment of this invention. The electrophotographic printer 100 includes a sheet handling unit A, an exposure unit B and an image developing device C. The sheet handling unit A includes a pair of sheet feed rollers 130 for feeding a photosensitive sheet 150 to a proper position at which image exposure is conducted, a sheet guide 140 for guiding travel of the sheet 150 and a pair of sheet discharge rollers 160 for discharging the light exposed sheet. The photosensitive sheet 150 is composed of an electrically conductive support layer and a photoconductive layer deposited thereon. The exposure unit B includes a cathode-ray tube CRT 110 whose screen provides an original image, CRT controller 200 for sending information to be printed to the CRT 110, and an optical system 120 for focussing an image displayed on the CRT 110 onto the photosensitive sheet 150 on the sheet guide 140. This CRT and CRT controller provides controlled brightness distribution on CRT screen in accordance with a method described in a third embodiment of this invention described later.

The image developing device C includes a charger 104 for precharging the photosensitive sheet 150 by corona discharge, image developing units 9a, 9b, 9c in which light exposed sheet 150 is successively developed, image development confronting electrodes 10a, 10b, 10c, development solution tanks 11a, 11b, 11c, electrically conductive doctor rollers 12a, 12b, 12c formed of metal for applying a voltage from a power supply to the photosensitive sheet 150, air jet nozzles 113a, 113b, 113c, and a charge eraser 115. The development solution or developer is composed of an electrically insulative medium and toner particles such as cyan, magenta and yellow toners dispersed therein. The image developing device is movable horizontally between the illustrated position and a position underneath the sheet guide 140 in synchronization with the exposure operation at the exposure unit B. The image developing units 9a, 9b, 9c, the confronting electrodes 10a, 10b, 10c, the developer tanks 11a, 11b, 11c, the doctor rollers 12a, 12b, 12c and the air jet nozzles 113a, 113b, 113c are grouped into three sets for successively developing an image with liquid developers containing the cyan, magenta and yellow toners, respectively.

In operation, the photosensitive sheet 150 is supplied onto the sheet guide 140 by the sheet feed rollers 130 and retained on the sheet guide 140 at a given position. The image developing device C moves into the position underneath the photosensitive sheet 150, and the sheet 150 undergoes electrical precharging by the corona discharge produced by the charger 104. Then, the exposure unit B focusses an image displayed on the screen of the CRT 110 onto the photosensitive sheet 150 in order to form an electrostatic latent image thereon. Thereafter, the image developing device C is moved to its original position, during which a predetermined voltage is applied to the developing unit 9a by way of the confronting electrode 10a, so that the electrostatic latent image on the sheet 150 is developed into a visible toner image, for example, cyan toner image.

A voltage is then applied to the electrically conductive roller 12a, which voltage is higher than the voltage remaining on the toners at a non-image area on the photosensitive sheet 150, and the voltage applied to the roller 12a has a polarity opposite to that of the voltage applied to the toner on the non image area. Therefore, the toner particles on the non-image area are removed and the developer liquid is subjected to smoothing or calendering, when the photosensitive sheet 150 is brought into contact with the electrically conductive roller 12a, and at the same time, excessive developing solution on the photosensitive sheet 150 is removed. Subsequently, air is ejected against the photosensitive sheet 150 from the air jet nozzle 113a, thereby to remove remaining toner carrier liquid from the sheet 150 to a certain extent without disturbing the toner layer in the imaging portion.

The same process as described above is also carried out for developing the image with magenta and yellow toners. By effecting the three developing processes, a color image is printed on the photosensitive sheet 150.

According to the first embodiment of this invention, a CRT displayed image is projected onto the photosensitive sheet and the developing device is movably provided for developing electrostatic latent image into the visible color image. Therefore, high quality color printing is achievable with a simple printer mechanism.

Figure 2:
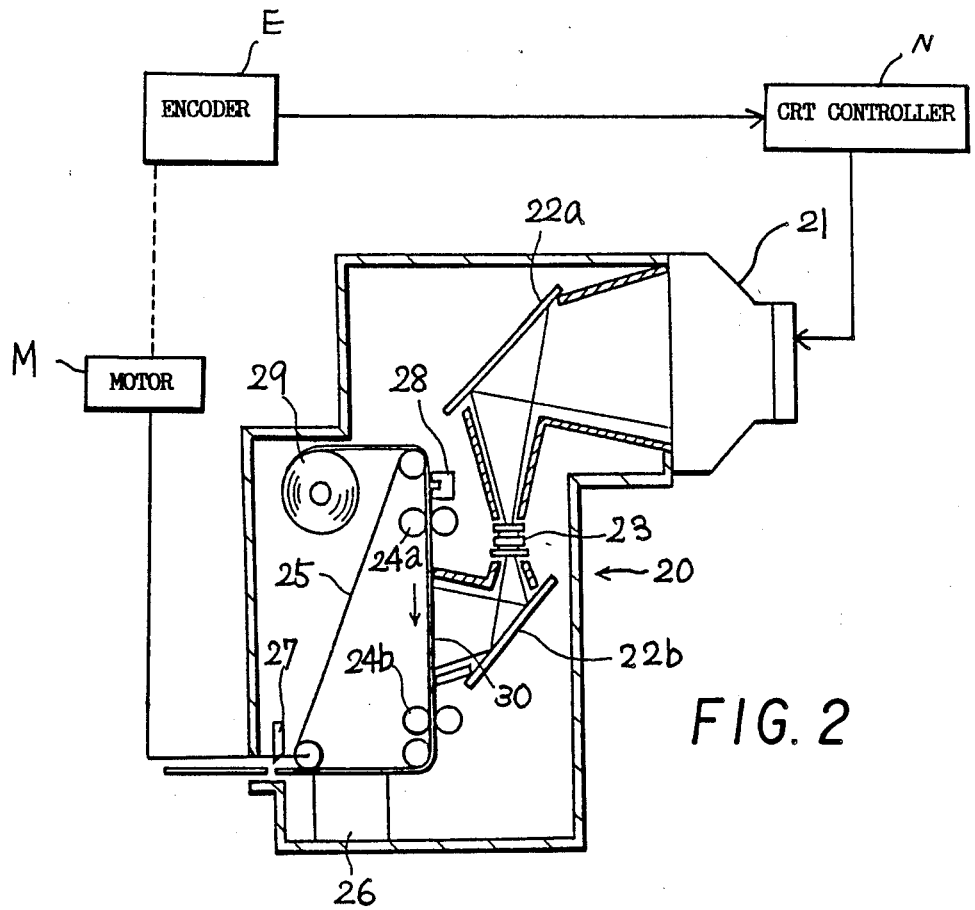
FIG. 2 is a schematic vertical cross-sectional view showing a copying apparatus according to another embodiment of the invention.

FIG. 2 shows a copying apparatus according to another embodiment of the invention. The copying apparatus generally denoted at 20 includes a CRT 21 for displaying an image to be copied as one of the components in an exposure unit similar to the first embodiment. The CRT provides its display image scrollable in vertical and/or lateral direction. Further, the exposure unit in the copying apparatus includes a pair of mirrors 22a, 22b for controllably directing light from the displayed image toward a photosensitive recording sheet 30, and a lens 23 disposed between the mirrors 22a and 22b.

A sheet handling unit of the copying apparatus includes pairs of drive rollers 24a and 24b for feeding the web like sheet 30, and an endless feed belt 25 operatively engaging the rollers 24a, 24b for supporting and feeding the photosensitive recording sheet 30. The photosensitive sheet 30 comprises a support layer and a photosensitive layer deposited on the support and made primarily of titanium dioxide. The sheet 30 is unreeled from a supply roll 29 and is wound by a takeup roll (not shown) or other suitable means.

A developing unit of the apparatus 20 includes a charger 28 for precharging the photosensitive sheet 30 travelled along the endless belt 26. The charger 28 is disposed at a position upstream side of the displayed image projection region on the sheet 30. Further, an image developing and fixing means 26 is disposed at downstream side of the displayed image projecting region for developing an electrostatic latent image into a visible image, and for fixing the visible image. Incidentally, a sheet cutter 27 is provided at a position adjacent an outlet end of the apparatus 20 for cutting off the sheet 30 into a desired length.

In the sheet handling unit, the endless belt 25 and/or the drive rollers 24a,24b are connected to a drive motor M to which an encoder E is coupled, so that the speed of travel of the photosensitive sheet 30 is detected by the encoder E. The output of the encoder E is applied to a CRT controller N so as to control scrolling speed in CRT screen in synchronization with the travelling speed of the photosensitive sheet 30. As a result, continuous output image is produced on the sheet 30.

In operation, light emitted from an image displayed on the screen of the CRT 21 is focussed onto the photosensitive sheet 30 by the mirror 22a, the lens 23 and the mirror 22b. The photosensitive sheet 30 is supplied from the sheet roll 29 by the feed belt 25 and the drive rollers 24a, 24b. While the photosensitive sheet 30 is being fed along, it is charged by the charger 28, and then an electrostatic latent image is formed on the sheet 30 by the light focussed thereon from the CRT 21. The speed of travel of the photosensitive belt 30 is detected by the encoder E and its output signal is sent to the CRT controller N so as to control the speed of scrolling in the CRT screen. As a result, the scrolling speed is equalized to the travelling speed of the sheet 30. After the image on the photosensitive sheet 30 has been developed and fixed by the image developing and fixing means 26, the photosensitive sheet 30 is cut off into a desired length by the sheet cutter 27, whereupon the copying process is completed. Incidentally, the CRT 21 provides its brightness controllable in accordance with the third embodiment of this invention.

Since the photosensitive sheet 30 can be continuously fed in synchronization with the scrolling of the image on the CRT 21 while the image is being copied on the sheet 30, the image can be continuously copied on the sheet 30 by a desired length.

A third embodiment according to the invention will be described with reference to FIGS. 3 thru 10. The third embodiment concerns an exposure unit, and particularly a CRT. This inventive CRT exposure method is applicable to the exposure units used in the foregoing embodiments.

Figure 4:
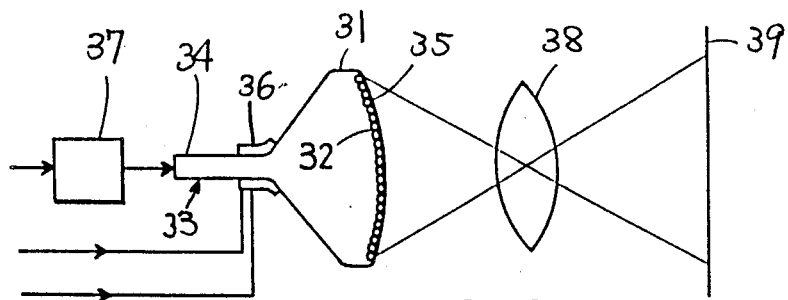
FIG. 4 is a schematic view showing a CRT and a control device therefor.

Before entering into a substantive discussion, the structure of a CRT will be described along with the problem of a reduction in brightness of the edge portions of an image which is formed on a photosensitive recording medium through an optical lens upon irradiation to the recording medium with light from the CRT. FIG. 4 shows the structure of the CRT and a control device therefor. The CRT includes a glass tube 31 having a flaring portion which has an inner surface coated with a phosphor layer 32 to provide a phosphor display screen 35. The glass tube 31 also has a neck portion remote from the phosphor display screen 35 and housing an electron gun 34. The interior space of the glass tube 31 is evacuated. An electron beam emitted from the electron gun 34 bombards the phosphor display screen 35 to enable the phosphor layer 32 to emit light. The spot where the electron beam hits the phosphor display screen 35 runs over the entire area of the phosphor display screen 35 along about 500 lines from an upper lefthand corner to a lower righthand corner of the screen 35. This scanning cycle is repeatedly carried out successively. To scan the phosphor display screen 35 in this manner, the electron beam is deflected on its path toward the phosphor display screen 35 by a magnetic field generated by a pair of horizontal and vertical deflection coils 36 mounted on the neck portion 33. The amount of the electric beam emitted from the electron gun 34 is varied dependent on the voltage applied to the electron gun 34 responsive to a video signal supplied. An image is formed on the phosphor display screen 35 as a pattern of intensities of light emitted from the phosphor display screen 35 as a result of electron beam bombardment.

The voltage is impressed on the electron gun 34 by a matrix circuit 37 according to the video signal. Actually, the video signal supplied to the matrix circuit 37 includes a luminance signal representing the brightness of a video image and a color difference signal representing the color tone of the video image. The horizontal and vertical deflection coils 36 are supplied with horizontal and vertical deflection signals shown in FIGS. 8 and 9, respectively, in synchronism with the video signal supplied to the matrix circuit, for deflecting the electron beam to scan the phosphor display screen 35. When these horizontal and vertical deflection signals are of the values indicated by the dotted lines in FIGS. 8 and 9, the electron beam spot is positioned at the center of the phosphor display screen 35 in horizontal and vertical deflection signals. As the values of the horizontal and vertical deflection signals are more distant from the dotted line levels, the electron beam spot is positioned more away from the center of the phosphor display screen 35.

Figure 5:
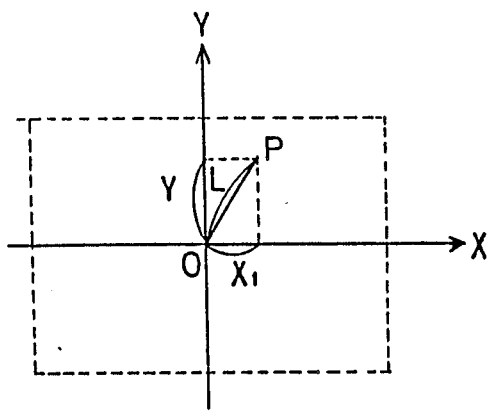
FIG. 5 is a diagram showing a coordinate system on a CRT phosphor screen and a photosensitive recording medium.
Figure 6:
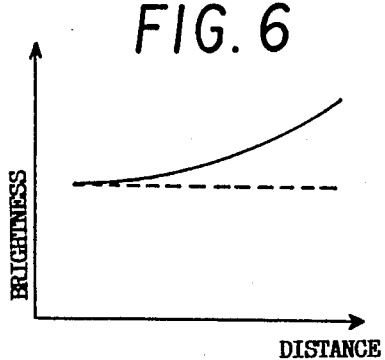
FIG. 6 is a graph showing a brightness distribution on the GRT phosphor screen.
Figure 7:
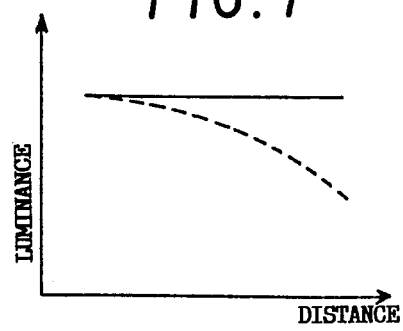
FIG. 7 is a graph showing an illumination distribution on the photosensitive recording medium on which an image displayed on CRT phosphor screen is formed through an optical lens.

When the image displayed on the phosphor display screen 35 is focussed on a photosensitive recording medium 39 through an optical lens 38, the brightness of the edge of the focussed image is lowered. More specifically, as shown in FIG. 5, it is assumed that a coordinate system having the abscissa X and the ordinate Y is established on each of the phosphor display screen 35 and the photosensitive recording medium 39. The distance L from the origin O of the coordinate system to a point P in the image can be expressed by $$L = \sqrt{X_1^2 + Y_1^2}$$

where $X_1$ and $Y_1$ are the X and Y coordinates of that point. FIG. 6 shows the relationship in the coordinate system between the brightness at the point P and the distance from the origin O to the point P on the phosphor display screen 35 or on the photosensitive recording medium 39 on which the displayed image is focussed by the optical lens 38. FIG. 7 shows the relationship between the illumination at the point P and the distance. The brightness distribution on a general RT screen is flat as indicated by the broken line in FIG. 6. When the image on the RT screen is focussed on the photosensitive recording medium 39 through the optical lens 38, the focussed CRT image has an illumination distribution as indicated by the broken line in FIG. 7.

Figure 3:
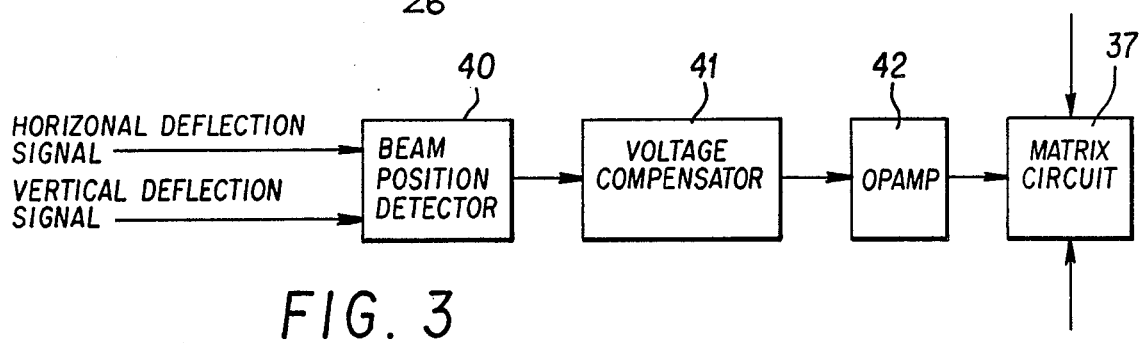
FIG. 3 is a block diagram showing an arrangement for carrying out an exposure with CRT according to still another embodiment of the present invention.
Figure 10:
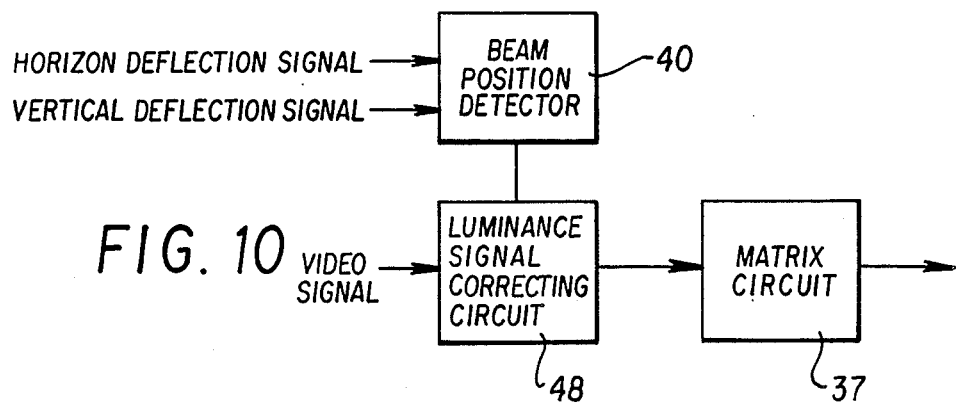
FIG. 10 is block diagram showing another arrangement for carrying out an exposure with CRT according to a still another embodiment of the invention.

Now according to the arrangement of the present invention as shown in FIG. 3, the X and Y coordinates of a spot here the electron beam mitted on the basis of a video signal synchronous with the horizontal and vertical deflection signals bombards the phosphor display screen 35 are detected by a beam position detector 40 to calculate the distance L from the origin O to the spot.

In order to compensate for a reduction in the brightness of the edge of the image focused on the photosensitive recording medium 39, a voltage compensator 41 applies a control signal, produced from the calculated distance L, through an operational amplifier 42 to the matrix circuit 37 to increase the voltage applied to the electron gun 34, thereby obtaining the brightness at the spot which should be achieved at the calculated distance L. That is, the brightness distribution on the CRT screen is corrected into a solid line curve as shown in FIG. 6 in order to make the illumination distribution on the photosensitive recording medium 39 flat as indicated by the solid line in FIG. 7. Therefore, an image displayed on the phosphor display screen 35 under the foregoing brightness compensation control and focused on the photosensitive recording medium 39 is free of any reduction in the brightness at the edge of the image.

Figure 8:
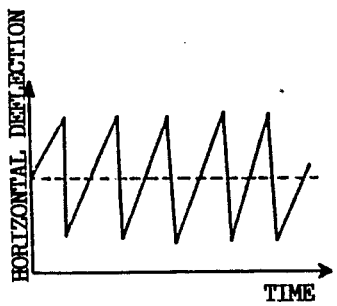
FIG. 8 is a graph showing a horizontal deflection signal.
Figure 9:
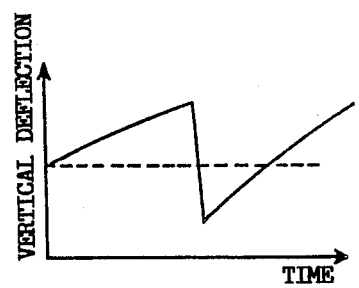
FIG. 9 is a graph showing a vertical deflection signal.

FIG. 8 shows another arrangement for carrying out the exposure method of the present invention. This arrangement includes the beam position detector 40 for calculating the distance L from the origin O to the electron beam spot by detecting the position of the electron beam spot. After the distance L has been calculated a luminance signal correcting circuit 43 corrects the luminance signal contained in the video signal to obtain corrected brightness at the beam spot based on the calculated distance L, and applies the corrected luminance signal to the matrix circuit 37. The matrix circuit 37 then applies a voltage which compensates for any reduction in the brightness of the edge of the image, to the electron gun 34.

While the invention has been described in detail with reference to specific embodiments thereof, it would be apparent for those skilled in the art that various changes and modifications can be made therein without departing from the spirit and scope of the invention.

What is claimed is:

1. A copying apparatus for forming a visible image on a photosensitive sheet comprising;
    a sheet handling unit having a light receiving portion for feeding said photosensitive sheet to said light receiving portion and for discharging said sheet therefrom;
    an exposure unit comprising a cathode ray tube which projects its displaying image onto said wherein said exposure unit further comprises an optical lens disposed between said cathode ray tube and said light receiving portion, and wherein said cathode ray tube has a screen whose edge portion provides brightness higher than that of the remaining portion of said screen. photosensitive sheet when said sheet is at said light receiving portion, said cathode ray tube having display image scrolling function;
    controlling means connected between said sheet handling unit and said cathode ray tube for controlling a speed of said scrolling in synchronization with a speed of feeding of said photosensitive sheet, so that a continuous latent image is provided on said photosensitive sheet in accordance with scrolling display image from said cathode ray tube; and,
    an image developing device for developing said latent image into said visible image.

2. The copying apparatus as defined in claim 1, wherein said controlling means comprises a detection means for detecting a moving speed of said photosensitive sheet on said sheet handling unit and providing an output signal indicative of said moving speed, and CRT controller connected to said detection means for controlling said scrolling speed in response to said output signal.

3. The copying apparatus as defined in claim 1, wherein said photosensitive sheet comprises a support layer, and a photoconductive layer disposed on said support, said photoconductive layer being formed of titanium dioxide.

4. The copying apparatus as defined in claim 1.

* * * * *